US010762151B2

(12) United States Patent
Chen

(10) Patent No.: US 10,762,151 B2
(45) Date of Patent: Sep. 1, 2020

(54) METHOD AND DEVICE FOR RECOMMENDING CONTENT TO BROWSER OF TERMINAL DEVICE AND METHOD AND DEVICE FOR DISPLAYING CONTENT ON BROWSER OF TERMINAL DEVICE

(71) Applicant: GUANGZHOU UCWEB COMPUTER TECHNOLOGY CO., LTD., Guangzhou (CN)

(72) Inventor: Huijuan Chen, Guangzhou (CN)

(73) Assignee: Guangzhou UCWeb Computer Technology Co., Ltd., Guangzhou (CN)

( * ) Notice: Subject to any disclaimer, the term of this patent is extended or adjusted under 35 U.S.C. 154(b) by 430 days.

(21) Appl. No.: 15/695,981

(22) Filed: Sep. 5, 2017

(65) Prior Publication Data

US 2018/0068026 A1 Mar. 8, 2018

(30) Foreign Application Priority Data

Sep. 8, 2016 (CN) .......................... 2016 1 0812280

(51) Int. Cl.
| | |
|---|---|
| *G06F 16/30* | (2019.01) |
| *G06F 16/9535* | (2019.01) |
| *H04L 29/08* | (2006.01) |
| *G06F 16/955* | (2019.01) |
| *G06F 16/9537* | (2019.01) |
| *G06F 16/2457* | (2019.01) |
| *G06F 16/954* | (2019.01) |

(52) U.S. Cl.
CPC .... *G06F 16/9535* (2019.01); *G06F 16/24578* (2019.01); *G06F 16/954* (2019.01); *G06F 16/955* (2019.01); *G06F 16/9537* (2019.01); *H04L 67/02* (2013.01); *H04L 67/18* (2013.01); *H04L 67/22* (2013.01)

(58) Field of Classification Search
CPC ............. G06F 16/2425; G06F 16/9535; G06F 16/435; G06F 16/955; G06F 16/24578
USPC ....... 707/607, 609, 687, 705, 790, 813, 769, 707/821
See application file for complete search history.

(56) References Cited

U.S. PATENT DOCUMENTS

| | | | |
|---|---|---|---|
| 7,921,108 B2 * | 4/2011 | Wang | ................. G06F 16/2425 707/724 |
| 8,996,530 B2 | 3/2015 | LuVogt et al. | |
| (Continued) | | | |

*Primary Examiner* — Sana A Al-Hashemi
(74) *Attorney, Agent, or Firm* — Sheppard Mullin Richter & Hampton LLP

(57) ABSTRACT

The present disclosure discloses a method and a device for recommending content to a browser of a terminal device and a method and a device for displaying recommended content on a browser of a terminal device. The method for recommending content to a browser of a terminal device includes: recommending content to a browser of a terminal device, where the content includes a first quantity X of popular content of a geographical area to which the terminal device currently belongs, a second quantity Y of content related to a historical user behavior of a user of the browser of the terminal device, and a third quantity Z of content related to a user numerical score of the browser of the terminal device. According to the present disclosure, content matching a browsing interest and habit of a user may be provided, to obtain a relatively high user click-through rate and desirable browsing experience.

14 Claims, 6 Drawing Sheets

(56) References Cited

U.S. PATENT DOCUMENTS

| | | |
|---|---|---|
| 9,760,802 B2 | 9/2017 | Chen et al. |
| 2009/0164408 A1* | 6/2009 | Grigorik ............. G06F 16/9535 |
| 2009/0199114 A1 | 8/2009 | Lewis et al. |
| 2009/0254971 A1* | 10/2009 | Herz ..................... G06Q 30/02 726/1 |
| 2009/0319329 A1 | 12/2009 | Aggarwal et al. |
| 2010/0169910 A1 | 7/2010 | Collins et al. |
| 2010/0174814 A1 | 7/2010 | Busschbach |
| 2010/0241944 A1 | 9/2010 | Athsani et al. |
| 2010/0250578 A1 | 9/2010 | Athsani et al. |
| 2010/0262495 A1 | 10/2010 | Dumon et al. |
| 2010/0293057 A1 | 11/2010 | Haveliwala et al. |
| 2011/0040740 A1 | 2/2011 | Nugent |
| 2011/0093458 A1 | 4/2011 | Zheng et al. |
| 2012/0078715 A1 | 3/2012 | Li et al. |
| 2012/0221687 A1* | 8/2012 | Hunter .................. G06F 16/435 709/219 |
| 2012/0254146 A1 | 10/2012 | Bennet |
| 2012/0254188 A1 | 10/2012 | Koperski et al. |
| 2013/0073568 A1 | 3/2013 | Federov et al. |
| 2013/0290110 A1 | 10/2013 | LuVogt et al. |
| 2015/0302468 A1 | 10/2015 | Tanaka |

* cited by examiner

METHOD AND DEVICE FOR RECOMMENDING CONTENT TO BROWSER OF TERMINAL DEVICE AND METHOD AND DEVICE FOR DISPLAYING CONTENT ON BROWSER OF TERMINAL DEVICE

TECHNICAL FIELD

The present disclosure relates to browser technologies, and more specifically, to a method and a device for recommending content to a browser of a terminal device and a server, and a method and a device for displaying recommended content on a browser of a terminal device and a terminal device.

RELATED ART

With the development of information technologies, designers are increasingly concerned with use experience of users. How to make manufactured products bring more desirable use experience to users is a technical problem into which technicians keep researching.

Currently, more and more terminal products are integrated with browser functions such as WeChat, microblogs, VK, and Facebook. These browser functions not only provide a browsing function but also actively provide information to users.

By providing a user with content in which the user may be interested, a browser may provide the user with more desirable use experience, making the user become more accustomed to the browser, so that the user uses the browser more frequently. This has a great significance to manufacturers of products including browser functions.

Therefore, a new technical solution needs to be provided to improve at least one of the foregoing technical problems in the prior art.

SUMMARY

An objective of the present disclosure is to provide a new technical solution of recommending content to a browser. According to a first aspect of the present disclosure, a method for recommending content to a browser of a terminal device is provided, including:

recommending content to a browser of a terminal device, where the content includes a first quantity X of popular content of a geographical area to which the terminal device currently belongs, a second quantity Y of content related to a historical user behavior of a user of the browser of the terminal device, and a third quantity Z of content related to a user numerical score of the browser of the terminal device.

Optionally or alternatively, the first quantity X, the second quantity Y, and the third quantity Z are associated with click-through rates CTR1, CTR2, and CTR3 of various content of the user of the browser.

Optionally, the first quantity X=CTR1/(CTR1+CTR2+CTR3)*B;

the second quantity Y=CTR2/(CTR1+CTR2+CTR3)*B; and the third quantity Z=CTR3/(CTR1+CTR2+CTR3)*B, where CTR1 is a ratio of a click quantity to a recommendation quantity of the popular content of the user;

CTR2 is a ratio of a click quantity to a recommendation quantity of the content related to the historical user behavior of the user;

CTR3 is a ratio of a click quantity to a recommendation quantity of the content related to the user numerical score of the user; and B is a total display quantity of the recommended content of the terminal device.

Optionally or alternatively, the popular content is universal popular content of a particular geographical area within a most recent preset time period.

Optionally or alternatively, the content related to the historical user behavior is content related to a searching, browsing, or social behavior of the user within a most recent preset time period.

Optionally or alternatively, the user numerical score is obtained based on statistical data of the historical user behavior.

Optionally or alternatively, the first quantity X of popular content of the geographical area to which the terminal device currently belongs, the second quantity Y of content related to the historical user behavior of the user of the browser of the terminal device, and the third quantity Z of content related to the user numerical score of the browser of the terminal device are all recommended in an order of quantities of clicks on the related content within a unit time.

Optionally or alternatively, the method further includes: a step of collecting geographical position information of the terminal device, and determining the popular content of the geographical area to which the terminal device currently belongs;

a step of collecting a historical user behavior of the user of the browser of the terminal device, performing semantic parsing, and searching for content related to the historical user behavior; and a step of collecting the historical user behavior of the user of the browser of the terminal device, performing statistical analysis and numerical scoring, and searching, according to a user numerical score, for content matching the user numerical score.

According to a second aspect of the present disclosure, a device for recommending content to a browser of a terminal device is provided, including: a processor, and a memory storing computer-readable instructions that, when executed by the processor, cause the processor to: recommend content to a browser of a terminal device, where the content includes a first quantity X of popular content of a geographical area to which the terminal device currently belongs, a second quantity Y of content related to a historical user behavior of a user of the browser of the terminal device, and a third quantity Z of content related to a user numerical score of the browser of the terminal device.

Optionally or alternatively, the first quantity X, the second quantity Y, and the third quantity Z are associated with click-through rates CTR1, CTR2, and CTR3 of various content of the user of the browser.

Optionally or alternatively, the first quantity X=CTR1/(CTR1+CTR2+CTR3)*B;

the second quantity Y=CTR2/(CTR1+CTR2+CTR3)*B; and the third quantity Z=CTR3/(CTR1+CTR2+CTR3)*B, where CTR1 is a ratio of a click quantity to a recommendation quantity of the popular content of the user;

CTR2 is a ratio of a click quantity to a recommendation quantity of the content related to the historical user behavior of the user;

CTR3 is a ratio of a click quantity to a recommendation quantity of the content related to the user numerical score of the user; and B is a total display quantity of the recommended content of the terminal device.

Optionally or alternatively, the popular content is universal popular content of a particular geographical area within a most recent preset time period.

Optionally or alternatively, the content related to the historical user behavior is content related to a searching, browsing, or social behavior of the user within a most recent preset time period.

Optionally or alternatively, the user numerical score is obtained based on statistical data of the historical user behavior.

Optionally or alternatively, the apparatus configured to recommend content to a browser of a terminal device recommends all of the first quantity X of popular content of the geographical area to which the terminal device currently belongs, the second quantity Y of content related to the historical user behavior of the user of the browser of the terminal device, and the third quantity Z of content related to the user numerical score of the browser of the terminal device in an order of quantities of clicks on the related content within a unit time.

Optionally or alternatively, the device further includes: an apparatus configured to collect geographical position information of the terminal device and determine the popular content of the geographical area to which the terminal device currently belongs;

an apparatus configured to collect a historical user behavior of the user of the browser of the terminal device, perform semantic parsing, and search for content related to the historical user behavior; and an apparatus configured to collect the historical user behavior of the user of the browser of the terminal device, perform statistical analysis and numerical scoring, and search, according to a user numerical score, for content matching the user numerical score.

According to a third aspect of the present disclosure, a server is provided, including the device according to the present disclosure, and configured to recommend content to a browser of a terminal device.

According to a fourth aspect of the present disclosure, a server is provided and is designed to perform the following operation:

recommending content to a browser of a terminal device, where the content includes a first quantity X of popular content of a geographical area to which the terminal device currently belongs, a second quantity Y of content related to a historical user behavior of a user of the browser of the terminal device, and a third quantity Z of content related to a user numerical score of the browser of the terminal device.

According to a fifth aspect of the present disclosure, a server is provided, including a memory and a processor, where the memory is configured to store an instruction, and the instruction is used to control the processor to operate to perform the method according to the present disclosure.

According to a sixth aspect of the present disclosure, a method for displaying recommended content on a browser of a terminal device is provided, including:

receiving information about content recommended to a browser; and displaying the recommended content, where the content includes a first quantity X of popular content of a geographical area to which a terminal device currently belongs, a second quantity Y of content related to a historical user behavior of a user of the browser of the terminal device, and a third quantity Z of content related to a user numerical score of the browser of the terminal device.

Optionally or alternatively, the first quantity X, the second quantity Y, and the third quantity Z are associated with click-through rates CTR1, CTR2, and CTR3 of various content of the user of the browser.

Optionally or alternatively, the first quantity $X=CTR1/(CTR1+CTR2+CTR3)*B$;

the second quantity $Y=CTR2/(CTR1+CTR2+CTR3)*B$; and the third quantity $Z=CTR3/(CTR1+CTR2+CTR3)*B$, where CTR1 is a ratio of a click quantity to a recommendation quantity of the popular content of the user;

CTR2 is a ratio of a click quantity to a recommendation quantity of the content related to the historical user behavior of the user;

CTR3 is a ratio of a click quantity to a recommendation quantity of the content related to the user numerical score of the user; and B is a total display quantity of the recommended content of the terminal device.

Optionally or alternatively, the popular content is universal popular content of a particular geographical area within a most recent preset time.

Optionally or alternatively, the content related to the historical user behavior is content related to a searching, browsing, or social behavior of the user within a most recent preset time.

Optionally or alternatively, the user numerical score is obtained based on statistical data of the historical user behavior.

Optionally or alternatively, the first quantity X of popular content of the geographical area to which the terminal device currently belongs, the second quantity Y of content related to the historical user behavior of the user of the browser of the terminal device, and the third quantity Z of content related to the user numerical score of the browser of the terminal device are all recommended in an order of quantities of clicks on the related content within a unit time.

Optionally or alternatively, the method further includes:

a step of sending geographical position information of the terminal device, so as to determine the popular content of the geographical area to which the terminal device currently belongs; and a step of sending a historical user behavior of the user of the browser of the terminal device, so as to perform semantic parsing and search for content related to the historical user behavior, and perform statistical analysis and numerical scoring and search, according to a user numerical score, for content matching the user numerical score.

Optionally or alternatively, the method further includes:

when the recommended content has been browsed by a client, skipping presenting or presenting the browsed content differently.

According to a seventh aspect of the present disclosure, a device for displaying recommended content on a browser of a terminal device is provided, including:

an apparatus configured to receive information about content recommended to a browser; and an apparatus configured to display the recommended content, where the content includes a first quantity X of popular content of a geographical area to which a terminal device currently belongs, a second quantity Y of content related to a historical user behavior of a user of the browser of the terminal device, and a third quantity Z of content related to a user numerical score of the browser of the terminal device.

Optionally or alternatively, the first quantity X, the second quantity Y, and the third quantity Z are associated with click-through rates CTR1, CTR2, and CTR3 of various content of the user of the browser.

Optionally or alternatively, the first quantity X=CTR1/(CTR1+CTR2+CTR3)*B;

the second quantity Y=CTR2/(CTR1+CTR2+CTR3)*B; and the third quantity Z=CTR3/(CTR1+CTR2+CTR3)*B, where CTR1 is a ratio of a click quantity to a recommendation quantity of the popular content of the user;

CTR2 is a ratio of a click quantity to a recommendation quantity of the content related to the historical user behavior of the user;

CTR3 is a ratio of a click quantity to a recommendation quantity of the content related to the user numerical score of the user; and B is a total display quantity of the recommended content of the terminal device.

Optionally or alternatively, the popular content is universal popular content of a particular geographical area within a most recent preset time.

Optionally or alternatively, the content related to the historical user behavior is content related to a searching, browsing, or social behavior of the user within a most recent preset time.

Optionally or alternatively, the user numerical score is obtained based on statistical data of the historical user behavior.

Optionally or alternatively, the first quantity X of popular content of the geographical area to which the terminal device currently belongs, the second quantity Y of content related to the historical user behavior of the user of the browser of the terminal device, and the third quantity Z of content related to the user numerical score of the terminal device are all recommended in an order of quantities of clicks on the related content within a unit time.

Optionally or alternatively, the device further includes:

an apparatus configured to send geographical position information of the terminal device, so as to determine the popular content of the geographical area to which the terminal device currently belongs; and an apparatus configured to send a historical user behavior of the user of the browser of the terminal device, so as to perform semantic parsing and search for content related to the historical user behavior, and perform statistical analysis and numerical scoring and search, according to a user numerical score, for content matching the user numerical score.

Optionally or alternatively, the device further includes:

an apparatus configured to skip presenting or present differently, when the recommended content has been browsed by a client, the browsed content.

According to an eighth aspect of the present disclosure, a terminal device is provided, including the device according to the present disclosure, and configured to display content recommended to a browser.

According to a ninth aspect of the present disclosure, a terminal device is provided and is designed to perform the following operations:

receiving information about content recommended to a browser; and displaying the recommended content, where the content includes a first quantity X of popular content of a geographical area to which the terminal device currently belongs, a second quantity Y of content related to a historical user behavior of a user of the browser of the terminal device, and a third quantity Z of content related to a user numerical score of the browser of the terminal device.

According to a tenth aspect of the present disclosure, a terminal device is provided, including a memory and a processor, where the memory is configured to store an instruction, and the instruction is used to control the processor to operate to perform the method according to the present disclosure.

According to an eleventh aspect of the present disclosure, a browser is provided, including the device according to the present disclosure, and configured to display recommended content on the browser.

According to a twelfth aspect of the present disclosure, a browser is provided and is designed to perform the following operations:

receiving information about content recommended to the browser; and displaying the recommended content, where the content includes a first quantity X of popular content of a geographical area to which a terminal device currently belongs, a second quantity Y of content related to a historical user behavior of a user of the browser of the terminal device, and a third quantity Z of content related to a user numerical score of the browser of the terminal device.

According to a thirteenth aspect of the present disclosure, a terminal device is provided, including the browser according to the present disclosure.

According to a further aspect, the present disclosure provides a non-transitory storage medium, comprising instructions stored therein. The instructions, when executed by one or more processors, cause the one or more processors to perform a method comprising: recommending content to a browser of a terminal device, wherein the content comprises a first quantity X of popular content of a geographical area to which the terminal device currently belongs, a second quantity Y of content related to a historical user behavior of a user of the browser of the terminal device, and a third quantity Z of content related to a user numerical score of the browser of the terminal device.

According to an embodiment of the present disclosure, content matching a browsing interest and habit of a user may be provided by comprehensively considering a regional disparity, a single historical behavior or multiple historical behaviors of the user, and a statistical numerical score of the user, to obtain a relatively high user click-through rate and desirable browsing experience.

By means of the following detailed description of exemplary embodiments of the present disclosure with reference to the accompanying drawings, other features and advantages of the present disclosure will become clear.

BRIEF DESCRIPTION OF THE DRAWINGS

The accompanying drawings, which are incorporated in and constitute a part of this specification, illustrate embodiments of present disclosure and, together with the description, serve to explain the principles of the present disclosure.

DETAILED DESCRIPTION

Various exemplary embodiments of the present disclosure are described in detail with reference to the accompanying drawings. It should be noted that unless otherwise specifically described, relative arrangement, numeric expressions and values of elements and steps described in the embodiments do not limit the scope of the inventions of the present disclosure.

The following description of one or more exemplary embodiments is merely illustrative, and is, by no means, used to limit the invention of the present disclosure and application or use thereof.

Technologies, methods, and devices known by a person of ordinary skill in the related field may not be discussed in detail, but if appropriate, the technologies, methods, and devices should be considered as a part of the specification.

In all examples shown and discussed herein, any specific value should be explained as merely exemplary, rather than be used as a limitation. Therefore, other examples of an exemplary embodiment may have different values.

It should be noted that similar reference numbers and letters represent similar items in the following drawings. Therefore, once a particular item is defined in a drawing, the item does not need to be further discussed in subsequent drawings.

Various embodiments and examples according to the present disclosure are described below with reference to the accompanying drawings.

<Method 1>

Figure 1:
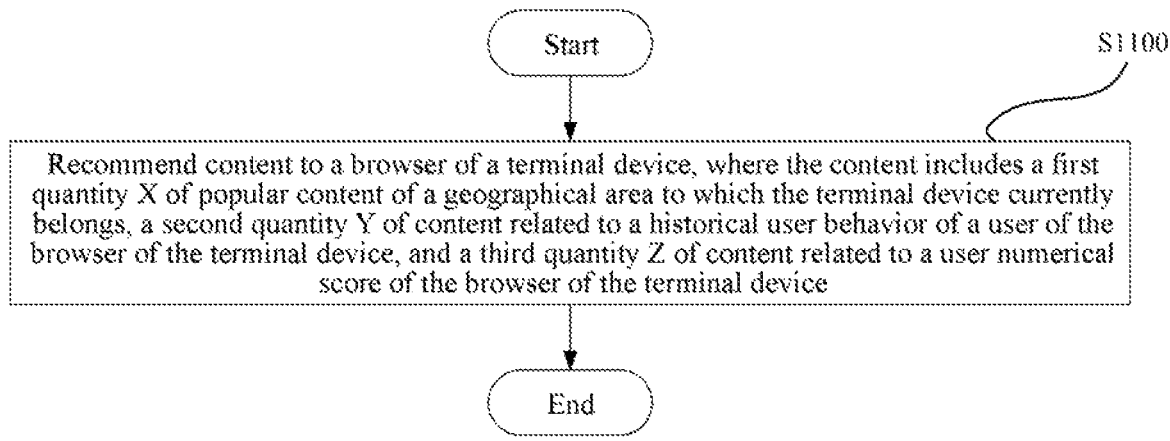
FIG. 1 is a flowchart of a method for recommending content to a browser of a terminal device according to an embodiment of the present disclosure.

FIG. 1 is a flowchart of a method for recommending content to a browser of a terminal device according to an embodiment of the present disclosure.

In step S1100, content is recommended to a browser of a terminal device, where the content includes a first quantity X of popular content of a geographical area to which the terminal device currently belongs, a second quantity Y of content related to a historical user behavior of a user of the browser of the terminal device, and a third quantity Z of content related to a user numerical score of the browser of the terminal device.

The geographical area to which the terminal device currently belongs may be a territorial scope such as a country, a province, a city, a district or a community. Popular content of a particular geographical area may be determined based on multiple browser algorithms. For example, a geographical label may be set for content and at the same time, the popular content is determined according to one or more pieces of statistical data such as a click quantity, a click-through rate or a growth rate of a click-through rate of the content, and the present disclosure does not limit the means for determining popular content for a particular geographical area. For example, the popular content may be universal popular content of a particular geographical area within a most recent preset time, for example, within 12 hours, one day, or one week.

The first quantity X, optionally, may be associated with a click-through rate CTR1 of browser users of the popular content of the geographical area to which the terminal device belongs. The click-through rate CTR1 is a ratio of a click quantity to a recommendation quantity of the popular content of the user. For example, when statistical data shows that a user clicks and browses 6 of 10 pieces of content recommended by the browser to the user, the click-through rate CTR1 is 60%. In an example, the click-through rate CTR1 may be determined based on a ratio of a click quantity to a recommendation quantity during a previous time of content recommendation to the user. In another example, the click-through rate CTR1 may also be an average value of ratios of click quantities to recommendation quantities during multiple times of content recommendation to the user. Certainly, the click-through rate CTR1 may also be determined based on other algorithms, as long as the click-through rate CTR1 can reflect a particular relationship between a click quantity and a recommendation quantity of the popular content of the geographical area of the user in statistical data.

The content related to the historical user behavior may be, for example, content related to a searching, browsing, or social behavior of the user. For example, the user has searched for content related to a star X or has browsed a web page related to football in the browser. Both the behaviors are defined as a single historical user behavior. In this case, content related to the star X or content related to football may both become recommended content. Optionally, related content may be recommended according to the historical user behavior within a most recent preset time.

The second quantity Y, optionally, may be associated with CTR2, that is, a ratio of a click quantity to a recommendation quantity of content related to a historical user behavior of the user of the browser. For example, when statistical data shows that a user clicks and browses 6 of 10 pieces of content recommended by the browser to the user, the click-through rate CTR2 is 60%. In an example, the click-through rate CTR2 may be determined based on a ratio of a click quantity to a recommendation quantity during a previous time of content recommendation to the user. In another example, the click-through rate CTR2 may also be an average value of ratios of click quantities to recommendation quantities during multiple times of content recommendation to the user. Certainly, the click-through rate CTR2 may also be determined based on other algorithms, as long as the click-through rate CTR2 can reflect a particular relationship between a click quantity and a recommendation quantity of the content related to the historical user behavior of the user in statistical data.

The content related to a user numerical score of the browser of the terminal device may be obtained based on the statistical data of the historical user behavior. For example, the user sets an interest order of the user, or after the historical user behavior is determined, it is obtained that the user has a strongest interest in content of entertainment and has a second strongest interest in content of science and technologies, so as to perform numerical scoring for the user. The numerical scoring may be performed in multiple manners, which are not limited in the present disclosure herein.

The third quantity Z, optionally, may be associated with CTR3, that is, a ratio of a click quantity to a recommendation quantity of content related to a user numerical score of the user of the browser. For example, when statistical data shows that a user clicks and browses 6 of 10 pieces of content recommended by the browser to the user, the click-through rate CTR3 is 60%. In an example, the click-through rate CTR3 may be determined based on a ratio of a click quantity to a recommendation quantity during a previous time of content recommendation to the user. In another example, the click-through rate CTR3 may also be an average value of ratios of click quantities to recommendation quantities during multiple times of content recommendation to the user. The click-through rate CTR3 may also be determined based on other algorithms, as long as the click-through rate CTR3 can reflect a particular relationship between a click quantity and a recommendation quantity of the content related to the user numerical score of the user in statistical data.

Further, from the aspect of determining the first quantity X, the second quantity Y, and the third quantity Z, the first quantity X=CTR1/(CTR1+CTR2+CTR3)*B, the second quantity Y=CTR2/(CTR1+CTR2+CTR3)*B, and the third quantity Z=CTR3/(CTR1+CTR2+CTR3)*B, where B is a total display quantity of the recommended content of the terminal device.

Optionally, the first quantity X of popular content of the geographical area to which the terminal device currently belongs, the second quantity Y of content related to the historical user behavior of the user of the browser of the terminal device, and the third quantity Z of content related to the user numerical score of the browser of the terminal device may all be recommended in an order of quantities of clicks on the related content within a unit time.

Figure 2:
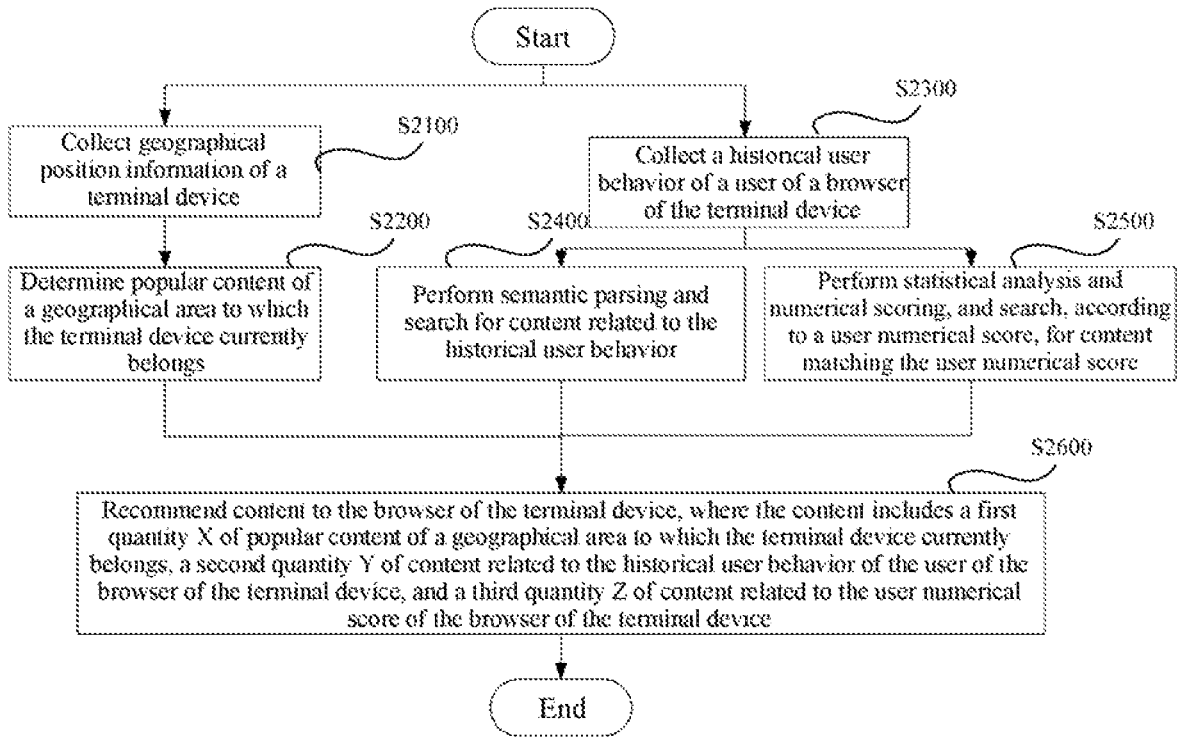
FIG. 2 is a flowchart of a method for recommending content to a browser of a terminal device according to another embodiment of the present disclosure.

FIG. 2 shows another embodiment according to the present disclosure, which is more specific than the embodiment shown in FIG. 1. In step S2100, geographical position information of a terminal device is collected. In step S2200, popular content of a geographical area to which the terminal device currently belongs is determined. In step S2300, a historical user behavior of a user of a browser of the terminal device is collected. By collecting the historical user behavior of the user of the browser of the terminal device, not only content is recommended based on the historical user behavior, but also numerical scoring is performed for the user. Therefore, a variety of historical user behaviors may be collected. For example, information such as an interest order set by the user may be further included. Subsequently, in step S2400, semantic parsing is performed and content related to the historical user behavior is searched for. In step S2500, statistical analysis and numerical scoring are performed, and content matching a user numerical score is searched for according to the user numerical score. Finally, in step S2600, content is recommended to the browser of the terminal device, where the content includes a first quantity X of popular content of the geographical area to which the terminal device currently belongs, a second quantity Y of content related to the historical user behavior of the user of the browser of the terminal device, and a third quantity Z of content related to the user numerical score of the browser of the terminal device.

By means of the method of this embodiment, recommended content matching a browsing interest and habit of a user may be provided by comprehensively considering a regional disparity, a single historical behavior or multiple historical behaviors of the user, and a statistical numerical score of the user. Therefore, compared with the prior art, by means of the technical solution of the present disclosure, content may be recommended to a user more precisely, to obtain a relatively high user click-through rate and desirable browsing experience.

<Device 1>

Figure 3:
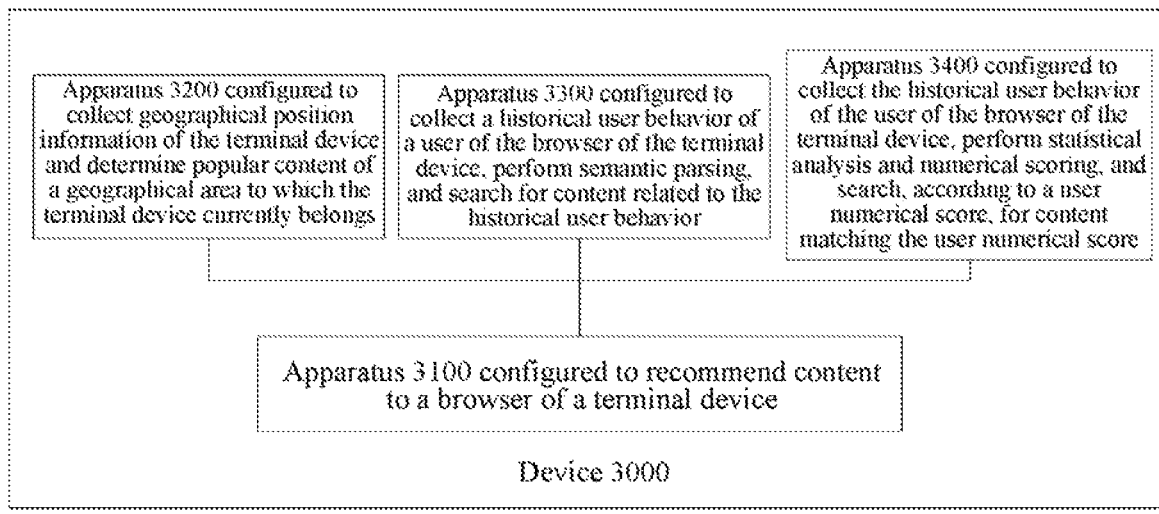
FIG. 3 is a schematic block diagram of a device for recommending content to a browser of a terminal device according to another embodiment of the present disclosure.

A person skilled in the art would appreciate that in the field of electronic technologies, the foregoing method may be embodied in products by means of software, hardware and a combination of software and hardware. A person skilled in the art can easily form a device 3000 for recommending content to a browser of a terminal device shown in FIG. 3 based on the method disclosed in the foregoing. The device 3000 includes: an apparatus 3100 configured to recommend content to a browser of a terminal device, where the content includes a first quantity X of popular content of a geographical area to which the terminal device currently belongs, a second quantity Y of content related to a historical user behavior of a user of the browser of the terminal device, and a third quantity Z of content related to a user numerical score of the browser of the terminal device.

For example, the first quantity X, the second quantity Y, and the third quantity Z are associated with click-through rates CTR1, CTR2, and CTR3 of various content of the user of the browser.

For example, the first quantity X=CTR1/(CTR1+CTR2+CTR3)*B; the second quantity Y=CTR2/(CTR1+CTR2+CTR3)*B; and the third quantity Z=CTR3/(CTR1+CTR2+CTR3)*B, where CTR1 is a ratio of a click quantity to a recommendation quantity of the popular content of the user; CTR2 is a ratio of a click quantity to a recommendation quantity of the content related to the historical user behavior of the user; CTR3 is a ratio of a click quantity to a recommendation quantity of the content related to the user numerical score of the user; and B is a total display quantity of the recommended content of the terminal device.

For example, the popular content is universal popular content of a particular geographical area within a most recent preset time. The content related to the historical user behavior is content related to a searching, browsing, or social behavior of the user within a most recent preset time. The user numerical score is obtained based on statistical data of the historical user behavior.

For example, the apparatus configured to recommend content to a browser of a terminal device recommends all of the first quantity X of popular content of the geographical area to which the terminal device currently belongs, the second quantity Y of content related to the historical user behavior of the user of the browser of the terminal device, and the third quantity Z of content related to the user numerical score of the browser of the terminal device in an order of quantities of clicks on the related content within a unit time.

In addition, for example, the device 3000 further includes: an apparatus 3200 configured to collect geographical position information of the terminal device and determine the popular content of the geographical area to which the terminal device currently belongs; an apparatus 3300 configured to collect a historical user behavior of the user of the browser of the terminal device, perform semantic parsing, and search for content related to the historical user behavior; and an apparatus 3400 configured to collect the historical user behavior of the user of the browser of the terminal device, perform statistical analysis and numerical scoring, and search, according to a user numerical score, for content matching the user numerical score.

The foregoing device may be implemented in an electronic device, so that the electronic device recommends content to a user more accurately. The electronic device, for example, may be a notebook computer, a smartphone, or a tablet computer.

Figure 4:
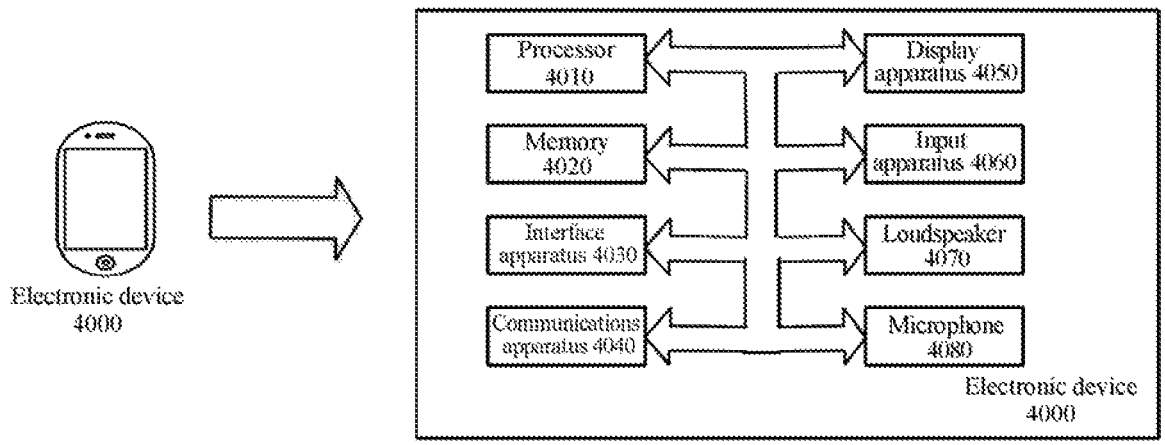
FIG. 4 is a schematic block diagram of an electronic device according to another embodiment of the present disclosure.

FIG. 4 is a schematic block diagram of an electronic device according to another embodiment of the present disclosure. As shown in FIG. 4, an electronic device 4000 may include a processor 4010, a memory 4020, an interface apparatus 4030, a communications apparatus 4040, a display apparatus 4050, an input apparatus 4060, a loudspeaker 4070, a microphone 4080, or the like.

The processor 4010, for example, may be a central processing unit (CPU) or a micro control unit (MCU). The memory 3020, for example, is a read-only memory (ROM), a random access memory (RAM), or a non-volatile memory such as a hard disk. The interface apparatus 4030, for example, is a USB interface or an earphone interface.

The communications apparatus 4040, for example, can perform wired or wireless communication.

The display apparatus 4050, for example, is a liquid crystal display screen or a touch display screen. The input apparatus 4060, for example, may be a touchscreen or a keyboard. A user may input/output voice information by means of the loudspeaker 4070 and the microphone 4080.

The electronic device shown in FIG. 4 is merely explanatory, and is, by no means, intended to limit the invention of the present disclosure, and application or use thereof.

In this embodiment, the memory 4020 is configured to store an instruction, and the instruction is used to control the processor 4010 to perform the method for recommending content shown in FIG. 1. A person skilled in the art would appreciate that although multiple apparatuses are shown in FIG. 4, the present disclosure may involve only some of the apparatuses, for example, the processor 4010 and the storage apparatus 4020. A person skilled in the art may design an instruction according to the solution disclosed in the present disclosure. How the instruction controls the processor to operate is common knowledge in the art, and therefore details are not described herein again.

<Server>

Figure 5:
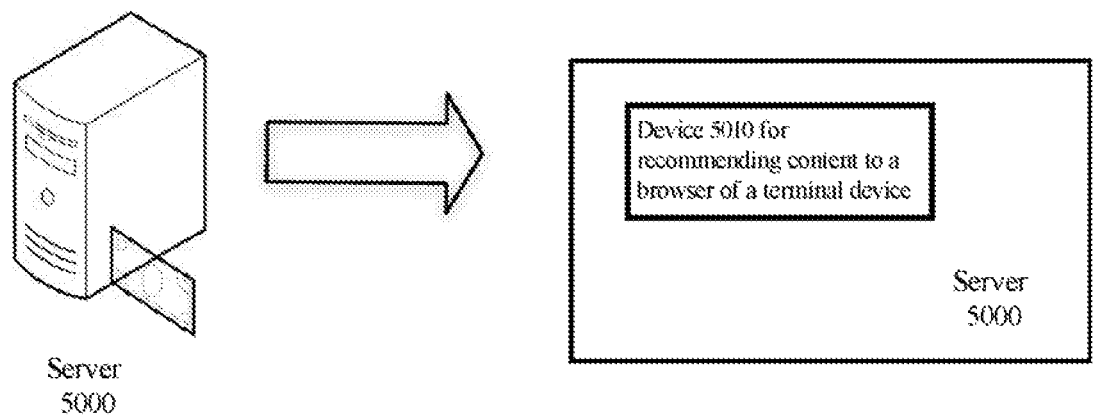
FIG. 5 is a schematic block diagram of a server according to another embodiment of the present disclosure.

FIG. 5 is a schematic block diagram of a server according to another embodiment of the present disclosure.

As shown in FIG. 5, a server 5000 includes a device 5010 for recommending content to a browser of a terminal device. The device 5010 for recommending content, for example, is the foregoing device for recommending content.

As stated above, for a person of ordinary skill in the field of electronic information technologies, a manner of describing a technical solution more directly and clearly is to describe each operation in the solution. From this aspect, in another embodiment, a server is further provided, and is designed to perform the following operations: recommending content to a browser of a terminal device, where the content includes a first quantity X of popular content of a geographical area to which the terminal device currently belongs, a second quantity Y of content related to a historical user behavior of a user of the browser of the terminal device, and a third quantity Z of content related to a user numerical score of the browser of the terminal device.

Figure 6:
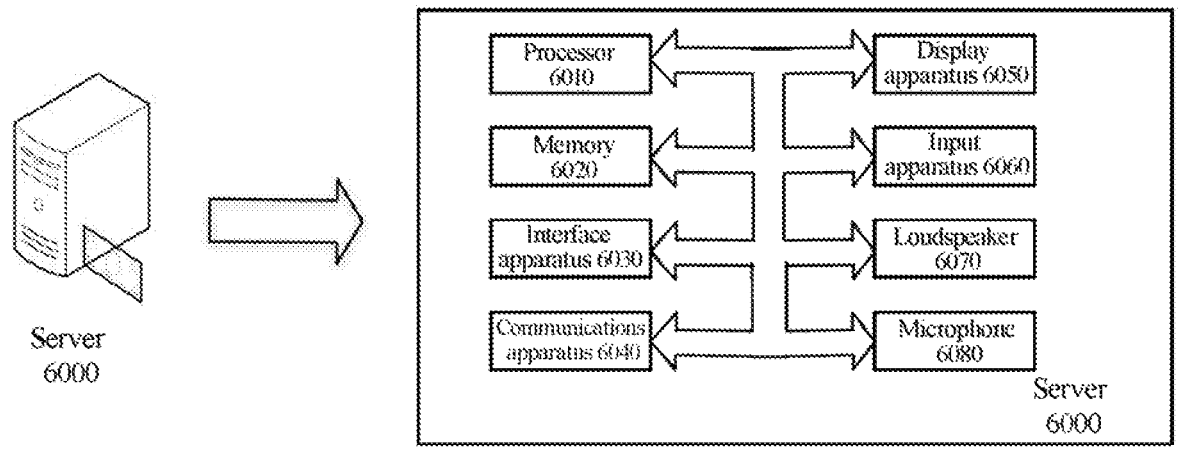
FIG. 6 is a schematic block diagram of a server according to another embodiment of the present disclosure.

FIG. 6 is a schematic block diagram of a server according to another embodiment of the present disclosure.

As shown in FIG. 6, an electronic device 6000 may include a processor 6010, a memory 6020, an interface apparatus 6030, a communications apparatus 6040, a display apparatus 6050, an input apparatus 6060, a loudspeaker 6070, a microphone 6080, or the like.

The processor 6010, for example, may be a CPU or an MCU. The memory 6020, for example, is a ROM, a RAM, or a non-volatile memory such as a hard disk. The interface apparatus 6030, for example, is a USB interface or an earphone interface.

The communications apparatus 6040, for example, can perform wired or wireless communication.

The display apparatus 6050, for example, is a liquid crystal display screen or a touch display screen. The input apparatus 6060, for example, may be a touchscreen or a keyboard. A user may input/output voice information by means of the loudspeaker 6070 and the microphone 6080.

The electronic device shown in FIG. 6 is merely explanatory, and is, by no means, intended to limit the invention of the present disclosure, and application or use thereof. In addition, some elements in FIG. 6 may be omitted according to requirements.

In this embodiment, the memory 6020 is configured to store instructions, and the instructions are used to control the processor 6010 to operate to perform the method for recommending content to a browser of a terminal device shown in FIG. 1. A person skilled in the art would appreciate that although multiple apparatuses are shown in FIG. 6, the present disclosure may involve only some of the apparatuses, for example, the processor 6010 and the storage apparatus 6020. A person skilled in the art may design instructions according to the solution disclosed in the present disclosure. How the instructions control the processor to operate is common knowledge in the art, and therefore details are not described herein again.

<Method 2>

Figure 7:
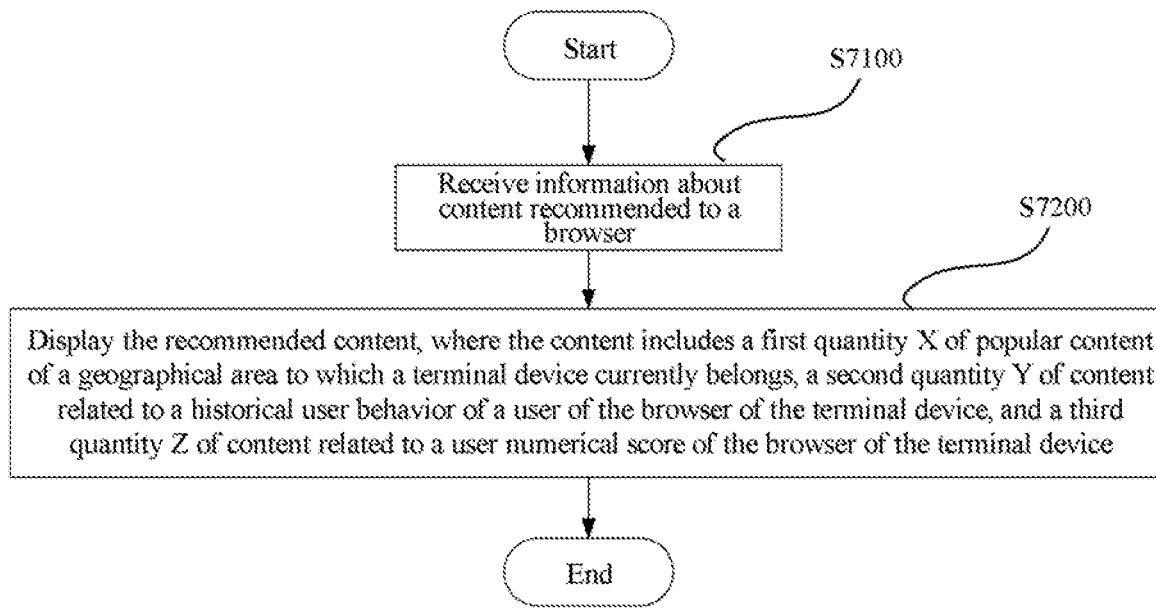
FIG. 7 is a flowchart of a method for displaying recommended content on a browser of a terminal device according to another embodiment of the present disclosure.

FIG. 7 is a flowchart of a method for displaying recommended content on a browser of a terminal device according to another embodiment of the present disclosure. In combination with the method for recommending content to a browser of a terminal device in FIG. 1, in step S7100, information about content recommended to a browser is received; and in step S7200, the recommended content is displayed. The content includes a first quantity X of popular content of a geographical area to which a terminal device currently belongs, a second quantity Y of content related to a historical user behavior of a user of the browser of the terminal device, and a third quantity Z of content related to a user numerical score of the browser of the terminal device.

The geographical area to which the terminal device currently belongs may be a territorial scope such as a country, a province, a city, a district or a community. Popular content of a particular geographical area may be determined based on multiple browser algorithms. For example, a geographical label may be set for content and at the same time, the popular content is determined according to one or more pieces of statistical data such as a click quantity, a click-through rate or a growth rate of a click-through rate of the content, and the present disclosure makes no limitation herein. For example, the popular content may be universal popular content of a particular geographical area within a most recent preset time, for example, within 12 hours, one day, or one week.

The first quantity X, optionally, may be associated with a click-through rate CTR1 of the popular content of the geographical area to which the terminal device belongs of the user of the browser. The click-through rate CTR1 is a ratio of a click quantity to a recommendation quantity of the popular content of the user. For example, when statistical data shows that a user clicks and browses 6 of 10 pieces of content recommended by the browser to the user, the click-through rate CTR1 is 60%. In an example, the click-through rate CTR1 may be determined based on a ratio of a click quantity to a recommendation quantity during a previous time of content recommendation to the user. In another example, the click-through rate CTR1 may also be an average value of ratios of click quantities to recommendation quantities during multiple times of content recommendation to the user. Certainly, the click-through rate CTR1 may also be determined based on another algorithm, as long as the click-through rate CTR1 can reflect a particular relationship between a click quantity and a recommendation quantity of the popular content of the geographical area of the user in statistical data.

The content related to the historical user behavior may be, for example, content related to a searching, browsing, or social behavior of the user. For example, the user has searched for content related to a star X or has browsed a web page related to football in the browser. Both the behaviors are defined as a single historical user behavior. In this case, content related to the star X or content related to football may both become recommended content. Optionally, related content may be recommended according to the historical user behavior within a most recent preset time.

The second quantity Y, optionally, may be associated with CTR2, that is, a ratio of a click quantity to a recommendation quantity of content related to a historical user behavior of the user of the browser. For example, when statistical data shows that a user clicks and browses 6 of 10 pieces of content recommended by the browser to the user, the click-through rate CTR2 is 60%. In an example, the click-through rate CTR2 may be determined based on a ratio of a click quantity to a recommendation quantity during a previous time of content recommendation to the user. In another example, the click-through rate CTR2 may also be an average value of ratios of click quantities to recommendation quantities during multiple times of content recommendation to the user. Certainly, the click-through rate CTR2 may also be determined based on another algorithm, as long as the click-through rate CTR2 can reflect a particular relationship between a click quantity and a recommendation quantity of the content related to the historical user behavior of the user in statistical data.

The content related to a user numerical score of the browser of the terminal device may be obtained based on the statistical data of the historical user behavior. For example, the user sets an interest order of the user, or after the historical user behavior is determined, it is obtained that the user has a strongest interest in content of entertainment and has a second strongest interest in content of science and technologies, so as to perform numerical scoring for the user. The numerical scoring may be performed in multiple manners, which are not limited in the present disclosure herein.

The third quantity Z, optionally, may be associated with CTR3, that is, a ratio of a click quantity to a recommendation quantity of content related to a user numerical score of the user of the browser. For example, when statistical data shows that a user clicks and browses 6 of 10 pieces of content recommended by the browser to the user, the click-through rate CTR3 is 60%. In an example, the click-through rate CTR3 may be determined based on a ratio of a click quantity to a recommendation quantity during a previous time of content recommendation to the user. In another example, the click-through rate CTR3 may also be an average value of ratios of click quantities to recommendation quantities during multiple times of content recommendation to the user. Certainly, the click-through rate CTR3 may also be determined based on another algorithm, as long as the click-through rate CTR3 can reflect a particular relationship between a click quantity and a recommendation quantity of the content related to the user numerical score of the user in statistical data.

Further, from the aspect of determining the first quantity X, the second quantity Y, and the third quantity Z, the first quantity $X=CTR1/(CTR1+CTR2+CTR3)*B$, the second quantity $Y=CTR2/(CTR1+CTR2+CTR3)*B$, and the third quantity $Z=CTR3/(CTR1+CTR2+CTR3)*B$, where B is a total display quantity of the recommended content of the terminal device.

Optionally, the first quantity X of popular content of the geographical area to which the terminal device currently belongs, the second quantity Y of content related to the historical user behavior of the user of the browser of the terminal device, and the third quantity Z of content related to the user numerical score of the browser of the terminal device may all be recommended in an order of quantities of clicks on the related content within a unit time.

Optionally, the method may further include: a step of sending geographical position information of the terminal device, so as to determine the popular content of the geographical area to which the terminal device currently belongs; and a step of sending a historical user behavior of the user of the browser of the terminal device, so as to perform semantic parsing and search for content related to the historical user behavior, and perform statistical analysis and numerical scoring and search, according to a user numerical score, for content matching the user numerical score.

In another example, when the recommended content has been browsed by a client, the browsed content is not presented or is presented differently.

By means of the method of this embodiment, recommended content matching a browsing interest and habit of a user may be provided by comprehensively considering a regional disparity, a single historical behavior or multiple historical behaviors of the user, and a statistical numerical score of the user. Therefore, compared with the prior art, by means of the technical solution of the present disclosure, content may be recommended to a user more accurately, to obtain a relatively high user click-through rate and desirable browsing experience.

<Device 2>

A person skilled in the art would appreciate that in the field of electronic technologies, the foregoing method may be embodied in products by means of software, hardware and a combination of software and hardware. A person skilled in the art can easily form a device 8000 for displaying recommended content on a browser of a terminal device shown in FIG. 8 based on the method disclosed in the foregoing. The device 8000 includes: an apparatus 8100 configured to receive information about content recommended to a browser, and an apparatus 8200 configured to display the recommended content, where the content includes a first quantity X of popular content of a geographical area to which a terminal device currently belongs, a second quantity Y of content related to a historical user behavior of a user of the browser of the terminal device, and a third quantity Z of content related to a user numerical score of the browser of the terminal device.

For example, the first quantity X, the second quantity Y, and the third quantity Z are associated with click-through rates CTR1, CTR2, and CTR3 of various content of the user of the browser.

For example, the first quantity X=CTR1/(CTR1+CTR2+CTR3)*B; the second quantity Y=CTR2/(CTR1+CTR2+CTR3)*B; and the third quantity Z=CTR3/(CTR1+CTR2+CTR3)*B, where CTR1 is a ratio of a click quantity to a recommendation quantity of the popular content of the user; CTR2 is a ratio of a click quantity to a recommendation quantity of the content related to the historical user behavior of the user; CTR3 is a ratio of a click quantity to a recommendation quantity of the content related to the user numerical score of the user; and B is a total display quantity of the recommended content of the terminal device.

For example, the popular content is universal popular content of a particular geographical area within a most recent preset time. The content related to the historical user behavior is content related to a searching, browsing, or social behavior of the user within a most recent preset time. The user numerical score is obtained based on statistical data of the historical user behavior.

For example, the device 8000 recommends all of the first quantity X of popular content of the geographical area to which the terminal device currently belongs, the second quantity Y of content related to the historical user behavior of the user of the browser of the terminal device, and the third quantity Z of content related to the user numerical score of the browser of the terminal device in an order of quantities of clicks on the related content within a unit time.

In addition, for example, the device 8000 further includes: an apparatus 8300 configured to send geographical position information of the terminal device, so as to determine the popular content of the geographical area to which the terminal device currently belongs; and an apparatus 8400 configured to send a historical user behavior of the user of the browser of the terminal device, so as to perform semantic parsing and search for content related to the historical user behavior, and perform statistical analysis and numerical scoring and search, according to a user numerical score, for content matching the user numerical score.

Optionally, the device 8000 may further include an apparatus configured to skip presenting or present differently, when the recommended content has been browsed by a client, the browsed content.

<Browser>

The device for displaying recommended content on a browser as described above may be an independent device (for example, an application in a client), or may be integrated in the browser and become a part of the browser. In this case, more accurate recommendation of content information can be achieved for the browser. A person skilled in the art would appreciate that with the development of technologies, a browser may be a separate application program, for example, an IE browser or a Chrome browser, or may also be an application program integrated with a browser function, for example, a microblog application program, a WeChat application program, a Facebook application program, or a VK application program.

Figure 10:
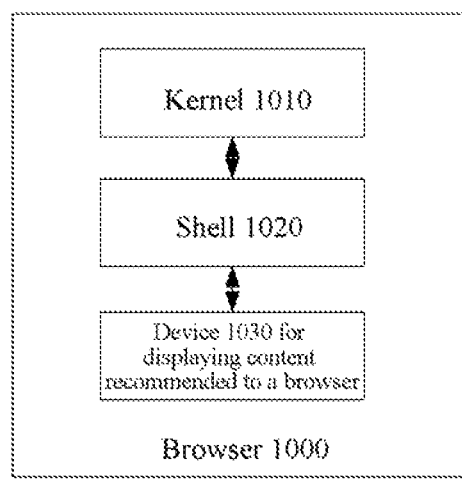
FIG. 10 is a schematic block diagram of a browser according to another embodiment of the present disclosure.

FIG. 10 is a schematic block diagram of a browser according to another embodiment of the present disclosure.

Generally, in terms of architecture, a browser may include two parts, that is, a kernel and a shell. The kernel of the browser is responsible for explaining syntax of a web page (for example, HTML or JavaScript) or rendering (displaying) the web page, that is, the browser parses and renders the web page by means of the kernel. The shell of the browser mainly processes an appearance interface and operation experience of the browser. In FIG. 10, a browser 1000 includes a kernel 1010 and a shell 1020. The browser 1000 further includes a device 1030 for displaying recommended content on the browser. The device 1030 for displaying recommended content on the browser may be a device for displaying recommended content on the browser according to the present disclosure. Although the device 1030 for displaying recommended content on the browser is located outside the shell 1020 and the kernel 1010 in FIG. 10 for clarity, a person skilled in the art would appreciate that the device 1030 for displaying recommended content on the browser may be located inside the shell 1020 or the kernel 1010.

It is commonly known to a person skilled in the art that with the development of electronic information technologies such as a large-scale integrated circuit technology and a trend of hardware realization of software, it appears to be difficult to find an explicit boundary between software and hardware of a computer system, because any operation may be implemented by software or may be implemented by hardware, and execution of any instruction may be completed by hardware or may be completed by software. Whether to use a hardware implementation solution or to use a software implementation solution to achieve a machine function depends on non-technical factors such as a price, a speed, reliability, a storage capacity, or a change period. Therefore, for a person of ordinary skill in the field of electronic information technologies, a manner of describing a technical solution more directly and clearly is to describe each operation in the solution. With the knowledge of an operation to be performed, a person skilled in the art may directly design an expected product based on consideration of the non-technical factors. From this aspect, in this embodiment, a browser is further provided. The browser is designed to perform the following operations: receiving information about content recommended to the browser; and displaying the recommended content, where the content includes a first quantity X of popular content of a geographical area to which a terminal device currently belongs, a second quantity Y of content related to a historical user behavior of a user of the browser of the terminal device, and a third quantity Z of content related to a user numerical score of the browser of the terminal device.

<Terminal Device>

Figure 8:
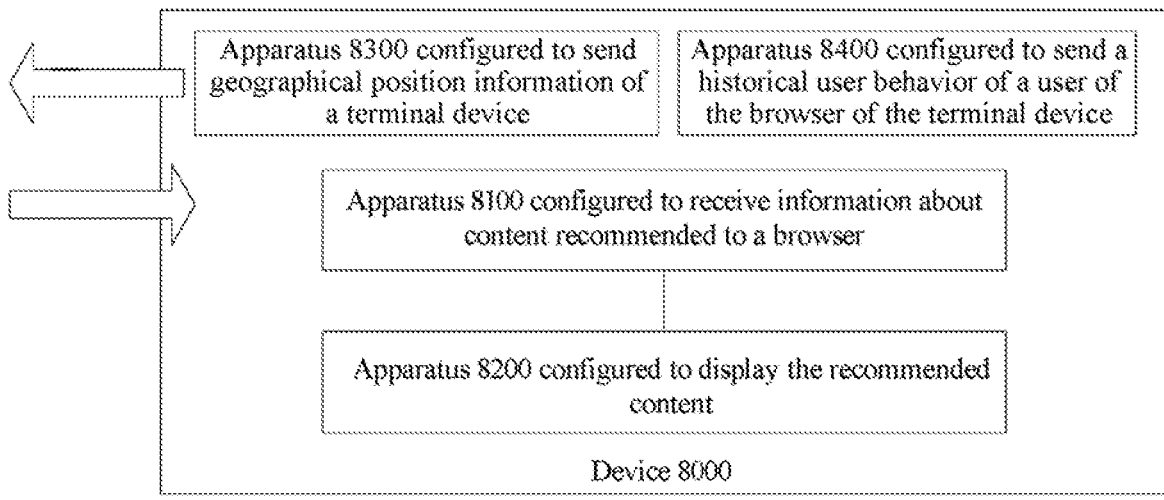
FIG. 8 is a schematic block diagram of a device for displaying recommended content on a browser of a terminal device according to another embodiment of the present disclosure.
Figure 9:
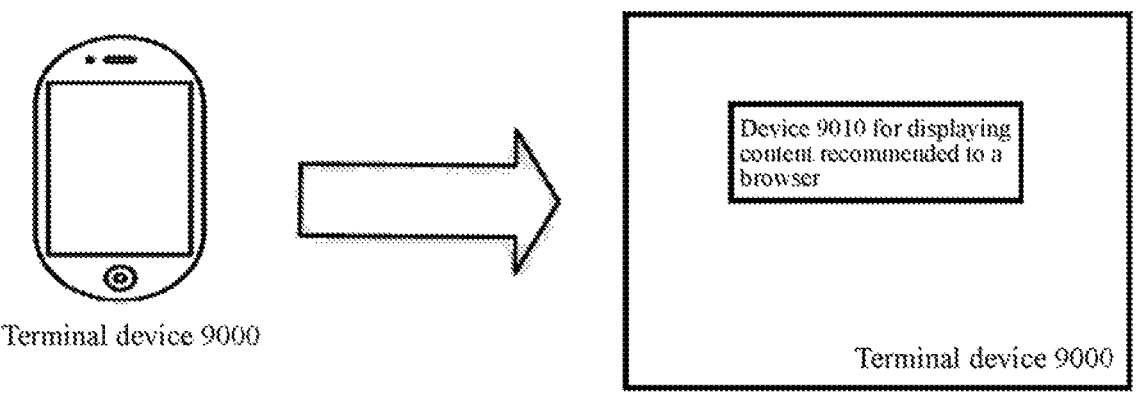
FIG. 9 is a schematic block diagram of a terminal device according to another embodiment of the present disclosure.
Figure 11:
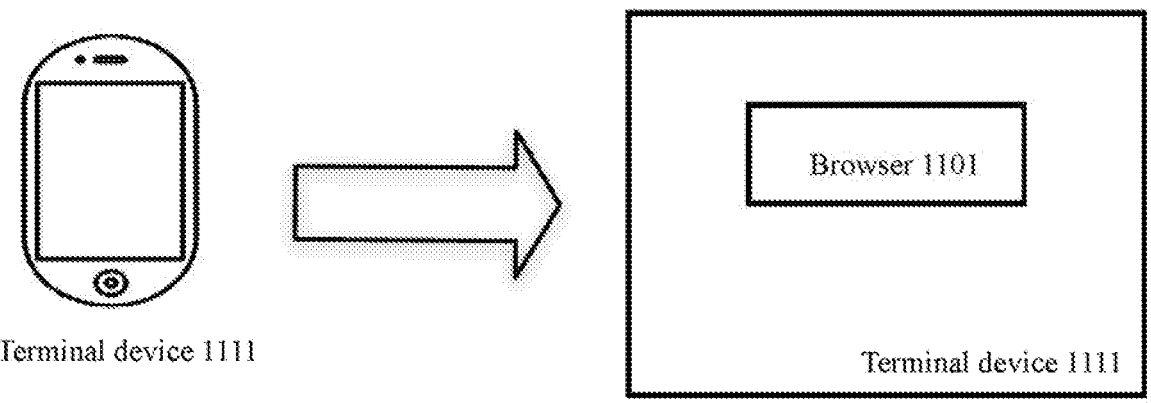
FIG. 11 is a schematic block diagram of a terminal device according to another embodiment of the present disclosure.

It would be appreciated that the device in FIG. 8 may be implemented in a terminal device. As shown in FIG. 9, a terminal device 9000 includes a device 9010 for displaying recommended content on a browser as stated above. Similarly, the browser in FIG. 10 may also be implemented in the terminal device. As shown in FIG. 11, a terminal device 1111 includes a browser 1101 as stated above, so that the terminal device recommends content to a user more accurately. The terminal device, for example, may be a notebook computer, a smartphone, or a tablet computer.

As stated above, for a person of ordinary skill in the field of electronic information technologies, a manner of describing a technical solution more directly and clearly is to describe each operation in the solution. From this aspect, in another embodiment, a terminal device is further provided, and is designed to perform the following operations: receiving information about content recommended to a browser; and displaying the recommended content, where the content includes a first quantity X of popular content of a geographical area to which the terminal device currently belongs, a second quantity Y of content related to a historical user behavior of a user of the browser of the terminal device, and a third quantity Z of content related to a user numerical score of the browser of the terminal device.

A schematic block diagram of a terminal device according to another embodiment of the present disclosure may similarly be shown in FIG. 4. An electronic device 4000 may include a processor 4010, a memory 4020, an interface apparatus 4030, a communication apparatus 4040, a display apparatus 4050, an input apparatus 4060, a loudspeaker 4070, a microphone 4080, or the like.

The processor 4010, for example, may be a CPU or an MCU. The memory 3020, for example, is a ROM, a RAM, or a non-volatile memory such as a hard disk. The interface apparatus 4030, for example, is a USB interface or an earphone interface.

The communications apparatus 4040, for example, can perform wired or wireless communication.

The display apparatus 4050, for example, is a liquid crystal display screen or a touch display screen. The input apparatus 4060, for example, may be a touchscreen or a keyboard. A user may input/output voice information by means of the loudspeaker 4070 and the microphone 4080.

The terminal device shown in FIG. 4 is merely explanatory, and is, by no means, intended to limit the present disclosure, and application or use thereof.

In this embodiment, the memory 4020 is configured to store an instruction, and the instruction is used to control the processor 4010 to operate to perform the method for displaying recommended content shown in FIG. 7. A person skilled in the art would appreciate that although multiple apparatuses are shown in FIG. 4, the present disclosure may involve only some of the apparatuses, for example, the processor 4010 and the storage apparatus 4020. A person skilled in the art may design an instruction according to the solution disclosed in the present disclosure. How the instruction controls the processor to operate is common knowledge in the art, and therefore details are not described herein again.

EXAMPLE

Figure 12:
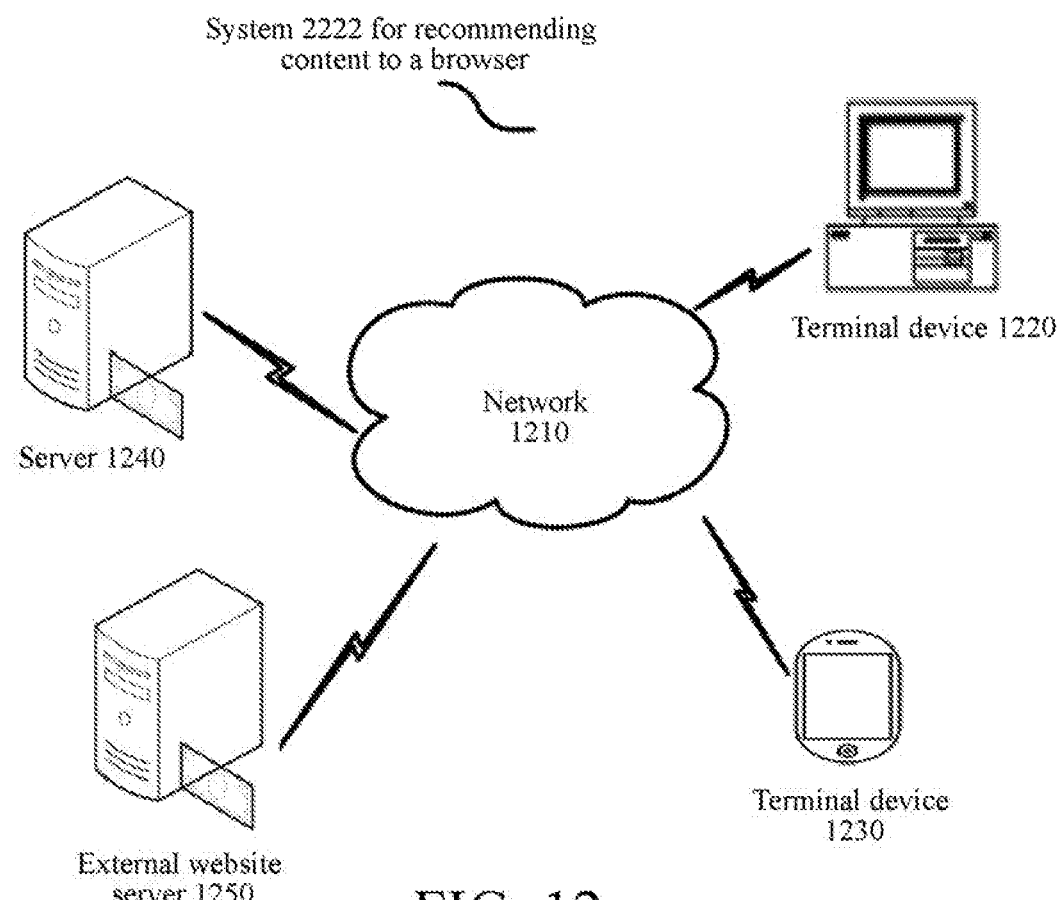
FIG. 12 is a schematic diagram of a system for recommending content to a browser according to an example of the present disclosure.

As shown in FIG. 12, in a system 2222 for recommending content to a browser, client devices 1220 and 1230, a server 1240 for recommending content, and an external website server 1250 for providing access to recommended content are connected by means of a network 1210. The client devices 1220 and 1230 may be the terminal device as stated above. The server 1240 may be a server related to a manufacturer of a browser product.

The client devices 1220 and 1230, for example, may access content on the external web site server 1250 by using the browser product. The client devices 1220 and 1230 send geographical position information of the terminal device to the server 1240, so that the server 1240 determines popular content of a geographical area to which the terminal device currently belongs; and the client devices 1220 and 1230 send a historical user behavior of a user of a browser of the terminal device to the server 1240, so as to perform semantic parsing and search for content related to the historical user behavior, and perform statistical analysis and numerical scoring and search, according to a user numerical score, for content matching the user numerical score. The server 1240 sends recommended content to the terminal devices 1220 and 1230. The terminal devices 1220 and 1230 display the recommended content. The content includes a first quantity X of popular content of the geographical area to which the terminal device currently belongs, a second quantity Y of content related to the historical user behavior of the user of the browser of the terminal device, and a third quantity Z of content related to the user numerical score of the browser of the terminal device. The terminal devices 1220 and 1230 may access, by means of the external website server 1250 for providing access to the recommended content, the recommended content that is clicked and browsed.

A person skilled in the art would appreciate that the solution of the present disclosure may be implemented on a server, or may also be implemented on an electronic terminal device.

The present disclosure may relate to a device, a method, and/or a computer program product. The computer program product may include a computer readable storage medium, which carries a computer readable program instruction used to enable a processor to implement various aspects of the present disclosure.

The computer readable storage medium may be a tangible non-transitory device capable of keeping and storing instructions used by an instruction execution device. The computer readable storage medium, for example, may be, but is not limited to, an electrical storage device, a magnetic storage device, an optical storage device, an electromagnetic storage device, a semiconductor storage device, or any proper combination of the foregoing devices. More specific examples (a non-exhaustive list) of the computer readable storage medium include: a portable computer disk, a hard disk, a RAM, a ROM, an erasable programmable ROM (EPROM or flash memory), a static RAM (SRAM), a portable compact disc ROM (CD-ROM), a digital versatile disc (DVD), a memory stick, a floppy disk, a mechanical coding device such as a punched card storing an instruction or a protruding structure in a groove, or any proper combination of the foregoing. The computer readable storage medium used herein is not explained as an instantaneous signal itself, such as radio wave or other freely propagated electromagnetic wave, electromagnetic wave propagated through a waveguide or another transmission medium (for example, an optical pulse that passes through a fiber-optic cable), or an electrical signal transmitted through an electrical wire.

The computer readable program instruction described herein may be downloaded from the computer readable storage medium to each computing/processing device, or downloaded to an external computer or an external storage device by means of a network such as the Internet, a local area network, a wide area network and/or a wireless network. The network may include a copper transmission cable, optical fiber transmission, wireless transmission, a router, a fire wall, a switch, a gateway computer, and/or an edge server. A network adapter or network interface in each computing/processing device receives the computer readable program instruction from the network, and forwards the computer readable program instruction, to store the computer readable program instruction in the computer readable storage medium in each computing/processing device.

The computer program instruction used for performing an operation of the present disclosure may be an assembly instruction, an instruction set architecture (ISA) instruction, a machine instruction, a machine-dependent instruction, a micro code, a firmware instruction, status setting data, or a source code or object code edited by using one programming language or any combination of multiple programming languages. The programming languages include an object-oriented programming language, such as Smalltalk or C++, and a conventional procedural programming language such as "C" language or a similar programming language. The computer readable program instruction may be completely executed on a user computer, partially executed on the user computer, executed as an independent software package, partially executed on the user computer and partially executed on a remote computer, or completely executed on the remote computer or server. In a case in which the remote computer is involved, the remote computer may be connected to the user computer through any type of network including a local area network (LAN) or a wide area network (WAN), or connected to an external computer (for example, connected through the Internet by means of an Internet service provider). In some embodiments, an electronic circuit such as a programmable logic circuit, a field programmable gate array (FPGA), or a programmable logic array (PLA) is customized in a personalized manner by using status information of the computer readable program instruction. The electronic circuit may execute the computer readable program instruction, so as to implement various aspects of the present disclosure.

Various aspects of the present disclosure are described herein with reference to flowcharts and/or block diagrams of methods, apparatuses (systems), and computer program products according to embodiments of the present disclosure. It would be appreciated that each block in the flowcharts and/or block diagrams or a combination of blocks in the flowcharts and/or block diagrams may be implemented by using the computer readable program instruction.

The computer readable program instructions may be provided to a processor of a general-purpose computer, a special-purpose computer or another programmable data processing apparatus, to produce a machine. In this way, an apparatus for implementing functions/actions specified in one or more blocks in the flowcharts and/or block diagrams is generated when the instructions are executed by the processor of the computer or the another programmable data processing apparatus. The computer readable program instructions may also be stored in the computer readable storage medium, and enable the computer, the programmable data processing apparatus and/or another device to work in a specific manner, so that the computer readable medium storing the instructions includes a manufactured product, which includes instructions for implementing various aspects of the functions/actions specified in one or more blocks in the flowcharts and/or block diagrams.

The computer readable program instructions may also be loaded to the computer, another programmable data processing apparatus, or another device, so as to perform a series of operations and steps on the computer, another programmable data processing apparatus, and another device, to generate a process implemented by the computer, thereby enabling instructions executed on the computer, another programmable data processing apparatus, or another device to implement the functions/actions specified in one or more blocks in the flowcharts and/or block diagrams.

Flowcharts and block diagrams in the accompany drawings show system architectures, functions, and operations that may be implemented by using systems, methods, and computer program products according to multiple embodiments of the present disclosure. At this point, each block in the flowcharts or the block diagrams may represent a part of a module, a program segment, or an instruction. The part of the module, the program segment, or the instruction includes one or more executable instructions used for implementing specified logical functions. In some alternative implementations, functions marked in the blocks may also occur in a sequence different from that marked in the accompany drawings. For example, actually, two continuous blocks may be basically executed in parallel, or sometimes be executed according to a reverse sequence, where a sequence depends on involved functions. It should also be noted that each block in the block diagrams and/or the flowcharts, and a combination of blocks in the block diagrams and/or the flowcharts may be implemented by using a hardware-based system dedicated for performing specified functions or operations, or by using a combination of dedicated hardware and a computer instruction. It is commonly known to a person skilled in the art that implementation by means of hardware, implementation by means of software, and implementation by means of a combination of software and hardware are equivalent to each other.

Various embodiments of the present disclosure are described above. The foregoing description is exemplary but is not exhaustive, and is not limited to the disclosed embodiments. Without departing from the scope and spirit of the described embodiments, many modifications and changes are obvious to a person of ordinary skill in the art. Selection of terms used in this specification intends to adequately explain principles of the embodiments, actual applications, or improvements to technologies in the market, or enabling other persons of ordinary skill in the art to understand the embodiments disclosed in this specification. The scope of the present disclosure is subject to the appended claims.

What is claimed is:

1. A method for recommending content to a browser of a terminal device, comprising:

recommending, to the browser, a first quantity X of popular content of a geographical area to which the terminal device currently belongs, a second quantity Y of content related to a historical user behavior of a user of the browser, and a third quantity Z of content related to a user numerical score of the browser, wherein:

$X=CTR1/(CTR1+CTR2+CTR3)*B$, $Y=CTR2/(CTR1+CTR2+CTR3)*B$, $Z=CTR3/(CTR1+CTR2+CTR3)*B$,

CTR1 is a ratio of a click quantity to a recommendation quantity of the popular content of the user, CTR2 is a ratio of a click quantity to a recommendation quantity of the content related to the historical user behavior of the user, CTR3 is a ratio of a click quantity to a recommendation quantity of the content related to the user numerical score of the user, and B is a total display quantity of the recommended content of the terminal device.

2. A device for recommending content to a browser of a terminal device, comprising:

a processor; and a memory storing computer-readable instructions that, when executed by the processor, cause the processor to recommend, to the browser, a first quantity X of popular content of a geographical area to which the terminal device currently belongs, a second quantity Y of content related to a historical user behavior of a user of the browser, and a third quantity Z of content related to a user numerical score of the browser, wherein:

$X=CTR1/(CTR1+CTR2+CTR3)*B$, $Y=CTR2/(CTR1+CTR2+CTR3)*B$, $Z=CTR3/(CTR1+CTR2+CTR3)*B$,

CTR1 is a ratio of a click quantity to a recommendation quantity of the popular content of the user, CTR2 is a ratio of a click quantity to a recommendation quantity of the content related to the historical user behavior of the user, CTR3 is a ratio of a click quantity to a recommendation quantity of the content related to the user numerical score of the user, and B is a total display quantity of the recommended content of the terminal device.

3. A non-transitory storage medium, comprising instructions stored therein, wherein the instructions, when executed by one or more processors, cause the one or more processors to perform a method comprising:

recommending, to the browser, a first quantity X of popular content of a geographical area to which the terminal device currently belongs, a second quantity Y of content related to a historical user behavior of a user of the browser, and a third quantity Z of content related to a user numerical score of the browser, wherein:

X=CTR1/(CTR1+CTR2+CTR3)*B,
Y=CTR2/(CTR1+CTR2+CTR3)*B,
Z=CTR3/(CTR1+CTR2+CTR3)*B,

CTR1 is a ratio of a click quantity to a recommendation quantity of the popular content of the user, CTR2 is a ratio of a click quantity to a recommendation quantity of the content related to the historical user behavior of the user, CTR3 is a ratio of a click quantity to a recommendation quantity of the content related to the user numerical score of the user, and B is a total display quantity of the recommended content of the terminal device.

4. The method according to claim 1, wherein the popular content is universal popular content of a particular geographical area within a most recent preset time period.

5. The method according to claim 1, wherein the content related to the historical user behavior is content related to a searching, browsing, or social behavior of the user within a most recent preset time period.

6. The method according to claim 1, wherein the user numerical score is obtained based on statistical data of the historical user behavior.

7. The method according to claim 1, wherein
the first quantity, the second quantity Y, and the third quantity are all recommended in an order of quantities of clicks on the related content within a unit time.

8. The method according to claim 1, further comprising:
collecting geographical position information of the terminal device, and determining the popular content of the geographical area to which the terminal device currently belongs;
collecting a historical user behavior of the user of the browser of the terminal device, performing semantic parsing, and searching for content related to the historical user behavior; and
collecting the historical user behavior of the user of the browser of the terminal device, performing statistical analysis and numerical scoring, and searching, according to the user numerical score, for content matching the user numerical score.

9. The device according to claim 2, wherein the popular content is universal popular content of a particular geographical area within a most recent preset time period.

10. The device according to claim 2, wherein the content related to the historical user behavior is content related to a searching, browsing, or social behavior of the user within a most recent preset time period.

11. The device according to claim 2, wherein the user numerical score is obtained based on statistical data of the historical user behavior.

12. The device according to claim 2, wherein the instructions, when executed by the processor, further cause the processor to recommend content to a browser of a terminal device all of the first quantity, the second quantity, and the third quantity in an order of quantities of clicks on the related content within a unit time.

13. The device according to claim 2, wherein the instructions, when executed by the processor, further cause the processor to:
collect geographical position information of the terminal device and determine the popular content of the geographical area to which the terminal device currently belongs;
collect a historical user behavior of the user of the browser of the terminal device, perform semantic parsing, and search for content related to the historical user behavior; and
collect the historical user behavior of the user of the browser of the terminal device, perform statistical analysis and numerical scoring, and search, according to the user numerical score, for content matching the user numerical score.

14. The non-transitory storage medium according to claim 3, further comprising instructions, when executed by the one or more processors, that cause the one or more processors to perform:
collecting geographical position information of the terminal device, and determining the popular content of the geographical area to which the terminal device currently belongs;
collecting a historical user behavior of the user of the browser of the terminal device, performing semantic parsing, and searching for content related to the historical user behavior; and
collecting the historical user behavior of the user of the browser of the terminal device, performing statistical analysis and numerical scoring, and searching, according to the user numerical score, for content matching the user numerical score.

* * * * *